Jan. 7, 1964   J. I. PRZHILENSKY   3,117,083
MECHANIZED AUTOMATIC FRAME FILTER PRESS
Filed Dec. 28, 1960   6 Sheets-Sheet 1

INVENTOR
JURY I. PRZHILENSKY

BY
ATTORNEY

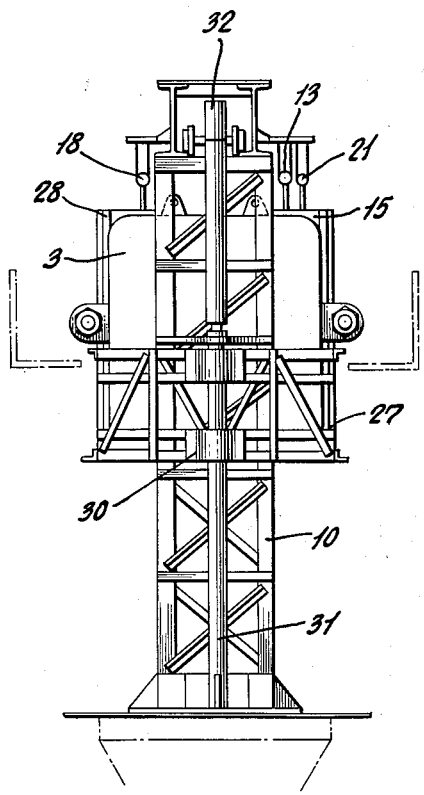

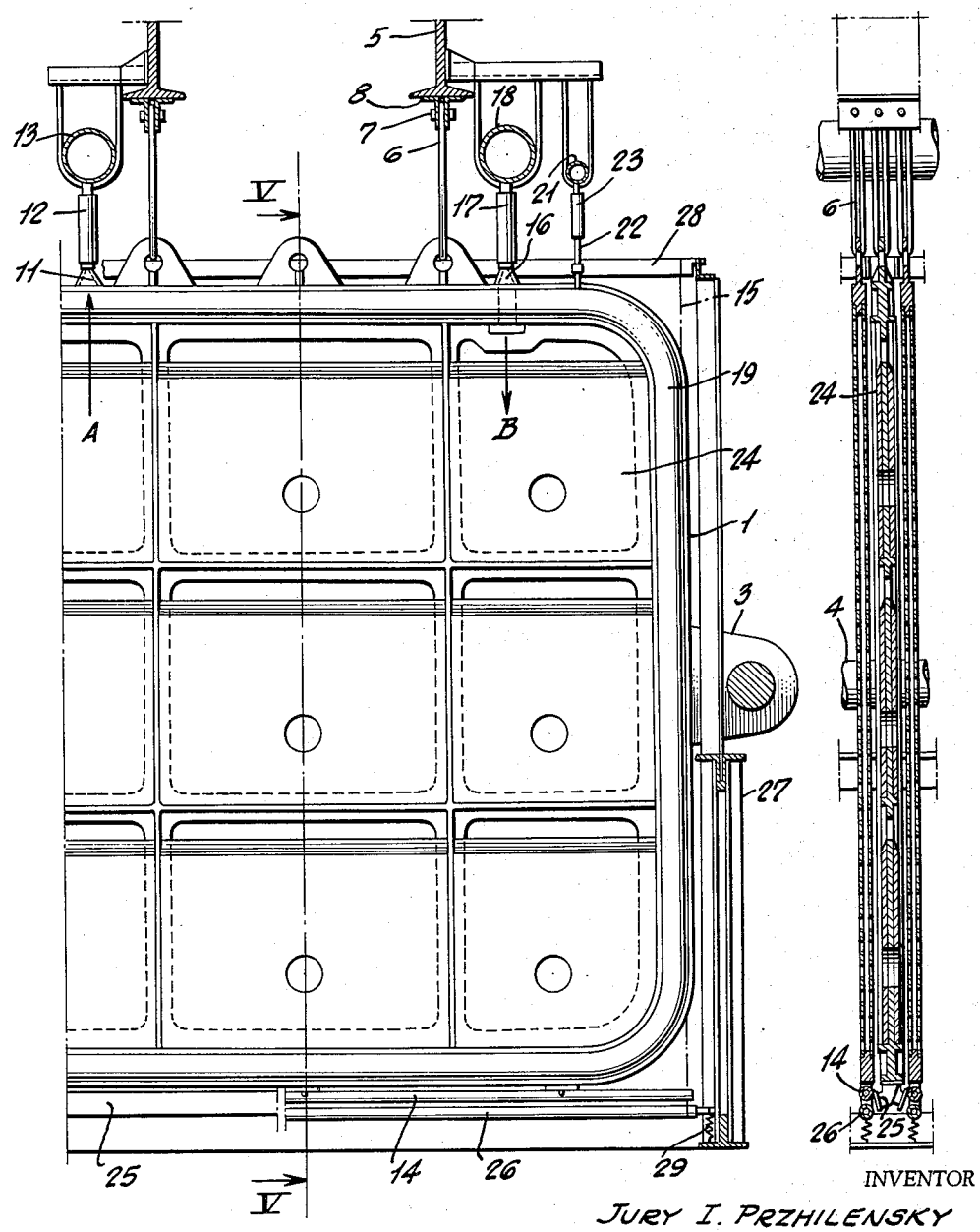

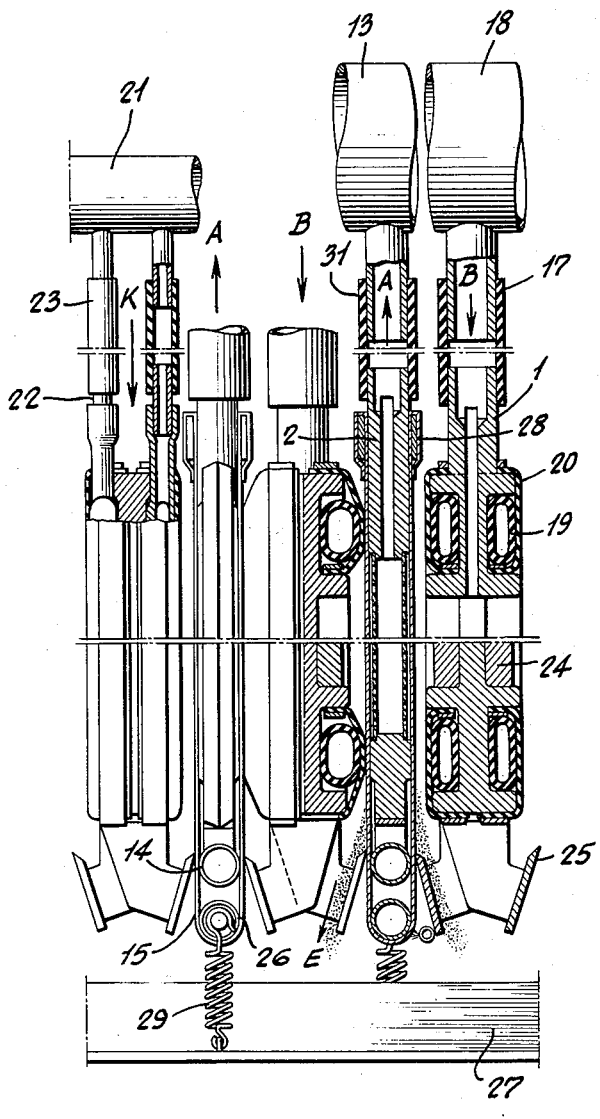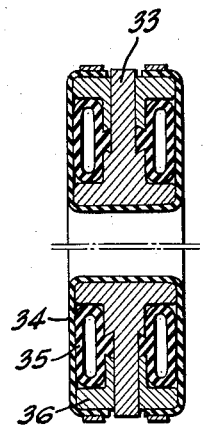

INVENTOR
JURY I. PRZHILENSKY
BY
ATTORNEY

United States Patent Office 3,117,083
Patented Jan. 7, 1964

3,117,083
MECHANIZED AUTOMATIC FRAME
FILTER PRESS
Jury Iosifovich Przhilensky, Ul. Sieszhinskaia 24, Apt. 47, Leningrad, U.S.S.R.
Filed Dec. 28, 1960, Ser. No. 79,079
5 Claims. (Cl. 210—225)

This invention relates to a mechanized automatic frame filter press.

Frame filter presses consisting of sliding frames and filter plates compressed by means of a hydraulic cylinder, or a screw device, between a fixed end thrust plate and a sliding end plate are commonly known and widely used for filtering suspensions.

With the existing designs of frame filter presses a great deal of time and heavy manual labour is wasted in moving the frames and plates and in cleaning the filter cloth when unloading the cake accumulated in the frames.

That is why the filtering area of such filter presses does not usually exceed 100 square metres. Besides, no known designs of frame filter presses allow mechanization and automation of the filtration process.

In the frame filter press described herein, the above shortcomings are eliminated owing to the fact that the frames and plates are suspended from the bearing structure with constant clearances, closed rubberized-cloth sealing hoses being inserted between the plates; when pressure is built up in these hoses they change their shape, sealing the clearances between the frames and plates, to form isolated air-tight filter chambers.

At the same time the sealing hoses press the filter cloth covering both sides of each plate tightly against the latter all around its perimeter. Both ends of each length of filter cloth are fastened by means of cross-pieces to the upper belt of a cradle, which can be lowered together with the plates, when the filtering cycle is completed, thus effecting removal of the cake accumulated on the filter cloth.

After the cake has been removed the filter cloth can be washed with water on both sides and blown with air.

These design features enable complete mechanization and automation of the filter press operation. The filtering area may be as large as 600 to 700 square metres.

Other features and advantages of the proposed filter press are evident from the description and the appended drawings.

Figure 1:
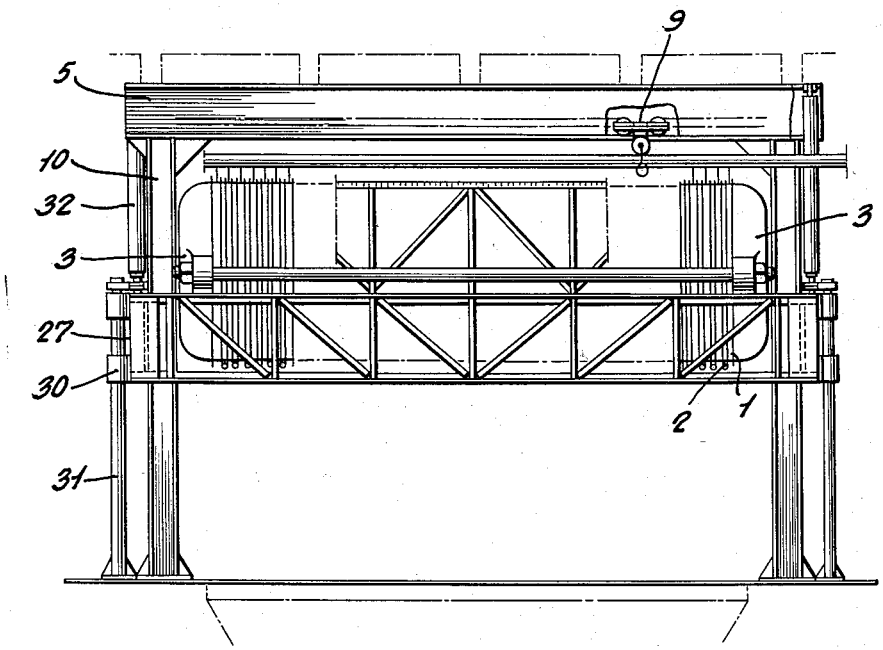
Figure 2:
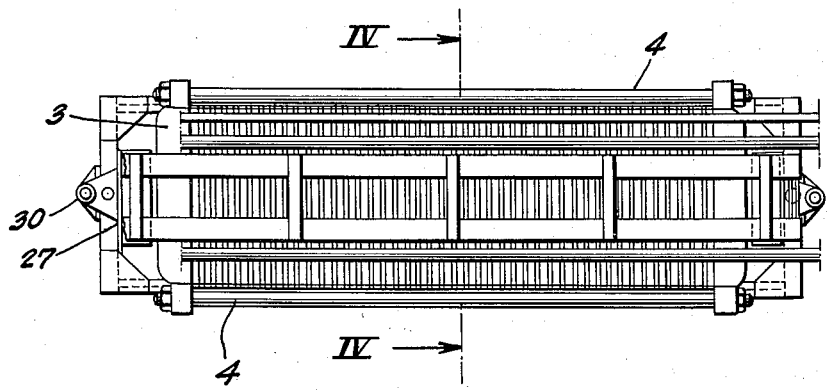
Figure 9:
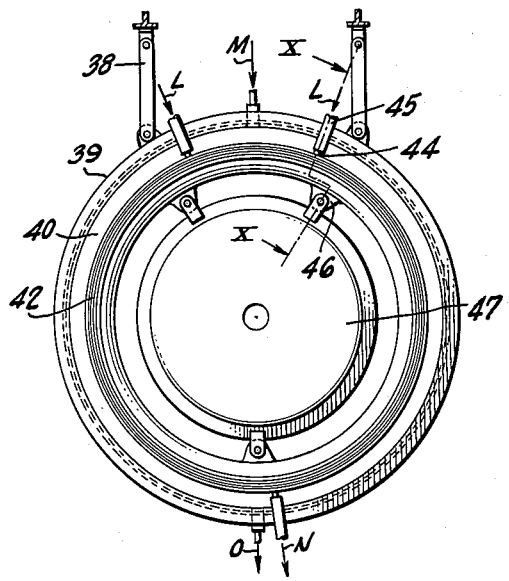
Figure 8:
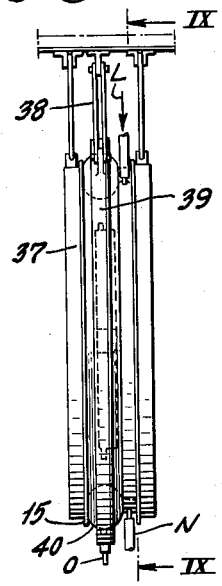
Figure 10:
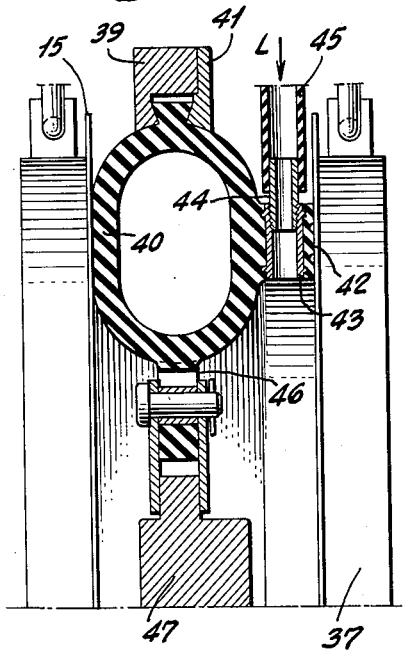
Figure 11:
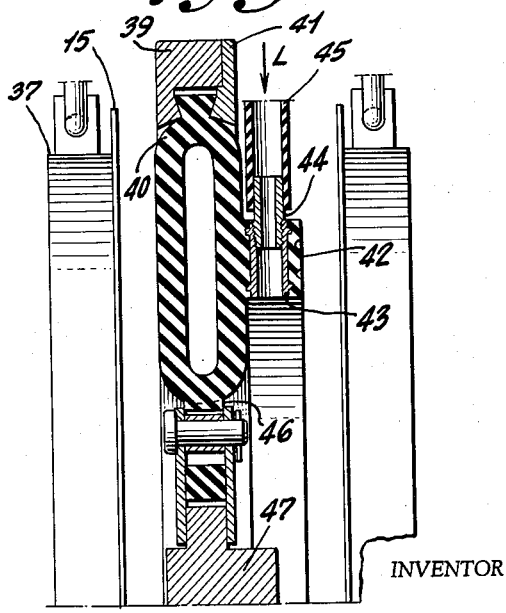
Figure 12:
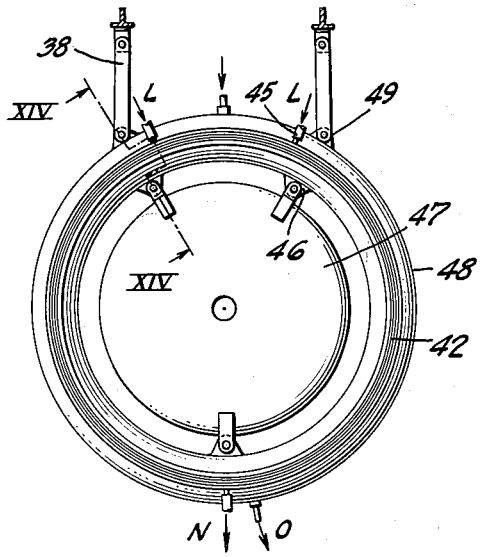
Figure 13:
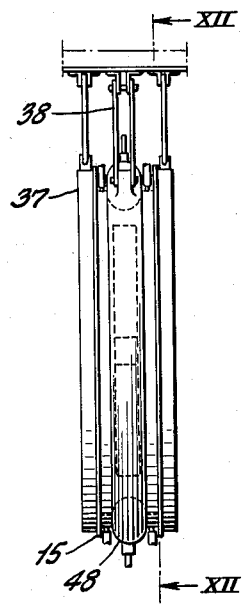
Figure 14:
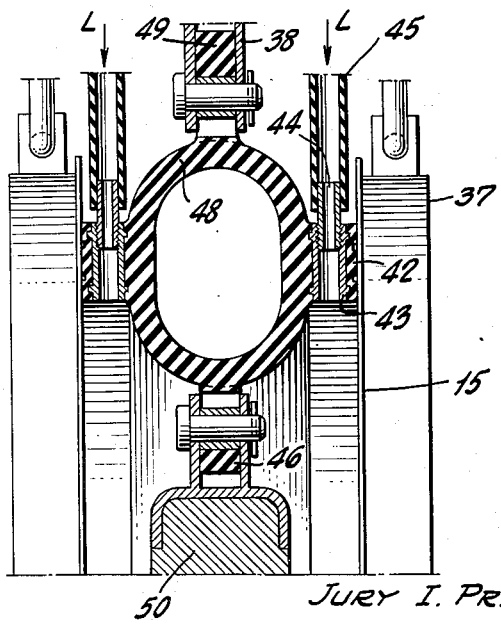

FIG. 1 is a side view of the frame filter press; FIG. 2 shows the filter press in plan; FIG. 3 is a front view; FIG. 4 is the section on IV—IV (ref. FIG. 2); FIG. 5 is the section on V—V (ref. FIG. 4); FIG. 6 shows a diagram of the sub-assemblies of frames and plates (partly in sectional view); FIG. 7 illustrates a version where the sealing hoses are held in place by wedge-shaped ribs and a common cover plate; FIG. 8 is a side view of a filter press section with one sealing hose in a hoop; FIG. 9 is the section on IX—IX (ref. FIG. 8); FIG. 10 is the section on X—X (ref. FIG. 9) with the hose under pressure; FIG. 11 is the section on X—X (ref. to FIG. 9) with the hose deflated; FIG. 12 is the section on XII—XII (ref. FIG. 13); FIG. 13 is a side view of a filter press section with one sealing hose and no hoop; FIG. 14 is the section on XIV—XIV (ref. FIG. 12).

The filter press consists of alternating frames 1 and filter plates 2 located between two fixed thrust plates 3, connected by tie-rods 4 to provide a stack. The plates 2 and frames 1, as well as the thrust plates 3 are suspended from the beams 5 of the bearing structure by means of shackles 6 fitted on bolts 7 passing through angles 8. The plates 2 and frames 1 have a central lug by which they are lifted during assembly and lowered for repairs by means of a truck 9 moving along beam 5. Beams 5 bear against columns 10 (or, alternatively, may be fastened to the ceilings, of columnless shops).

The filtrate is drained from the central filtrate receiving chamber in each filter plate in the direction shown by arrow A through a tapered boss 11 terminating in a pipe union connected by a rubber tube 12 to the filtrate collector 13. The filtrate may also be removed through closed or open drain holes, not shown, in the lower end of the filter plates. Fixed to the lower end of the flat annular core of each plate are spacing tubes 14 arranged between the lower edge portions of the filter cloth 15. Tubes 14 engage the filter cloth and prevent inward movement during removal of the cake from the cloth and may be employed for washing the cloth with water, for which purpose they must have through axial holes as well as transverse apertures for directing streams of water against the cloth.

The frames 1 have an I-section reinforcing rim and are provided with tapered bosses 16 for feeding a liquid to be filtered in the direction indicated by arrow B; these bosses have pipe unions connected by rubber tubes 17 to pipeline 18 through which the liquid is supplied. Each annular channel of the frame rim accommodates an air or hydraulic sealing hose or tubular member 19 made of rubber and protected by a rubber cover 20. The hoses have branch pieces for feeding compressed air or water under pressure, these branch pieces being connected to pipeline 21 by means of steel tubes 22 and runner tubes 23. To reduce the volume of the inner space of the frame it is filled with wooden, plastic, or any other packing 24 providing a web having holes to prevent unbalanced pressure of the filter liquid against it. Two inclined adjustable scraping knives 25 are mounted opposite each spacing tube on the rim at the bottom of the frame for removing the filter cake from the filter cloth. These knives may also be mounted on the filter plate. The adjustable mounting for the knives 25 is not shown in the drawing, but may be conventional and may include slots receiving clamping bolts.

Both surfaces of each filter plate are covered with a common length of filter cloth 15 which runs around tensioning tubes 26. All the filter cloth lengths on the filter press can be raised and lowered simultaneously by means of a travelling cradle 27. The top ends of the filter cloth lengths are attached to cradle 27 by cross members 28 fastened to the upper girth of the cradle. The tensioning tubes 26 are fixed through springs 29 to the lower girth of the cradle.

Cradle 27 is rectangular in plan and consists of two longitudinal and two lateral trusses connected rigidly to each other. In the middle of each lateral truss, on top and at the bottom, there is a slide block 30 which travels along post 31. The cradle is hinged to the rods of two pneumatic or hydraulic cylinders 32 which, in their turn, are hinged to beams 5. The cradle travel depends on the height of the frames and shall be chosen so that when the cradle is lowered the full length of the filter cloth will move past the knives 25.

Before commencing operation compressed air or water is forced into the sealing hoses or tubular members 19 along pipe line 21 in the direction indicated by arrow K. This changes the cross sectional shape of the tubular members from a flat oval to a shape approaching a circle and presses the hoses against the plates and they hold down the edges of the filter cloth, forming filter recesses in the filter plates. The liquid to be filtered is fed into these recesses under pressure. In the process of filtration the filtrate passes into collector 13 from the filtrate receiving chambers, while the filter cake remains on the cloth. After a certain period of time, when a given cake thickness has accumulated, delivery of the filter liquid into the chamber is discontinued and compressed air is fed through the pipe 18 into it, forcing the liquid out of the chamber and the liquid out of the cake (the filter cake may be dried by blowing with hot air). If the cake is to be washed with water, the latter is forced through pipe 18 into the chamber under pressure and then expelled from the chamber, after washing, by compressed air.

When filtration, washing and blowing of the filter cake is completed, the pressure inside hoses 19 is relieved and they resume their original shape clearing the plates and opening the filter chambers. Then pressure is applied to cylinder 32, causing the cradle to move downwards together with the filter cloth 15, knives 25 serving to remove the cake from the cloth as the cloth moves downward with respect to the knives. The filter cake falls in the direction shown by arrow E into a receptacle, not shown, such as a trough, tank, conveyor, or the like. After that, the cradle and the filter cloth are returned to their initial positions and the cycle is repeated.

Filtration in the proposed filter press is fully automatic and mechanized, as all valves on the pulp, air and water feed, and the filtrate removal lines, as well as the starting unit of the air cylinders for lifting and lowering the cradles are fitted with pneumatic, hydraulic, or electromagnetic drives and are interlocked. They are controlled by a common automatic device of the usual type by means of which the duration of each separate operation can be adjusted as necessary.

Thus, the filter press requires no labour except adjustment and general attention.

The new filter press proposed herein may be executed in different design modifications which are described below.

The two sealing hoses in the grooves of each frame may be substituted by a single sealing hose, of special shape, which will seal the clearance between two filter plates, thus simplifying the design, reducing the number of hoses to one-half their original number and cutting the distance between the filter plates as well as the total length of the filter press.

FIGS. 8 and 9 show such a sealing hose installed in a hoop; FIGS. 10 and 11 are sections on X—X.

As can be seen from these drawings the frames between the filter plates 37 are substituted by hoops 39 provided with eyes and suspended from hangers 38. The sealing hoses 40 are fixed in these hoops by a dovetail rib which is secured in the hoop groove by a removable shaped plate 41 screwed to the hoop. In this case all around the entire perimeter of the sealing hoses tubular members, on one or both sides, are continuous bosses or annular sealing ribs 42 with inserts 43 vulcanized into them, these inserts being threaded at one end to receive nipples 44, with rubber tubes 45 connecting them to the pipe lines through which the filter liquid, compressed air, or wash water can be fed to the filter chamber in the direction indicated by arrow L or removed in that indicated by arrow N.

Around the inside perimeter of the sealing hoses there are a number of lugs 46 with holes for fastening diaphragm attachments 47 by means of clamps and pins.

Compressed air, or water, is fed under pressure to the hose 40 in the direction indicated by arrow M and is removed in the direction indicated by arrow O.

In this form of the invention the chambers for receiving the liquid to be filtered are provided by the filter plates 37 engaging the sealing ribs 42 on the hoses 40 and the diaphragms 47 closing the annular space inwardly of the hoses 40. The liquid to be filtered is supplied to these chambers through the pipes L, and flows therefrom through the filter cloth.

FIGS. 12 and 13 show another version where the sealing hose or tubular member is installed without any hoop. FIG. 14 is the section on XIV—XIV, the hose being shown under pressure in this figure.

As can be seen from the above mentioned drawings, this version has no frames or hoops, the sealing hoses 48 having continuous bosses or annular sealing ribs 42 on both sides, with inserts 43 vulcanized into them onto which are screwed nipples 44 connected by rubber tubes 45 to the pipe lines through which the filter liquid, compressed air, or wash water are fed into the filter chambers in the direction shown by arrow L and are removed from them in the direction shown by arrow N.

The sealing hoses 48 have lugs 49 on their outside perimeters with holes by means of which they can be suspended from the bearing structure of the filter press.

The sealing hoses 48 have bosses 46 with holes on their inside perimeters for fastening diaphragm attachments 50.

The latter version makes the filter press design still simpler and the filter press cheaper.

What I claim is:

1. A filter apparatus comprising a plurality of filter frames and filter plates assembled in alternate face-to-face relationship providing a horizontally disposed stack, an end plate on each end of said stack, tie rods connecting said end plates, a structure for supporting said stack in an elevated position, a cradle surrounding said stack and mounted for vertical movement on said structure, means for raising and lowering said cradle with respect to said stack, each filter plate comprising a flat annular core providing a central filtrate receiving chamber, a single length of filter cloth in the form of a vertically disposed loop surrounding said core and said chamber, cross members secured to said cradle and to the upper free edges of said cloth, a tension bar disposed in the lower end of said loop, tension springs connected to said bar and said cradle for maintaining said cloth in stretched condition, a cloth spacing tube disposed within said cloth loop between the lower edge of said core and said bar and secured to said core, said core having a passage communicating with said chamber and a conduit connected to said passage for conducting filtrate therefrom and for supplying water or air to said chamber for cleaning said cloth, each filter frame comprising a reinforcing rim surrounding a central web, a filter liquid receiving recess on each side of said web, means to supply filter liquid to each recess, said web having a plurality of apertures providing communication between said recesses, said rim having an annular outwardly opening channel in each side, a closed tubular member of flexible material disposed in each channel, means for supplying fluid pressure to each tubular member, a cover sheet of resilient material secured to said rim and overlying each channel and tubular member, each tubular member normally having a flat oval cross sectional shape substantially entirely received within each channel and outwardly projecting cloth scraping knives secured to the lower portion of said rim, the scraping edge of each knife engaging the adjacent filter cloth opposite said spacing tube, whereby upon supplying fluid pressure to said tubular members the cross sectional shape thereof will approach a circle thereby forcing said cover sheet outwardly to clamp said filter cloth in engagement with said core to provide an annular seal for said recesses and chambers to provide for flow of filter liquid from said recesses through said filter cloth into said chambers, release of fluid pressure from said tubular members serving to disengage said cover sheet from said cloth, vertical movement of said cradle serving to move said filter cloth with respect to said knives thereby scraping accumulated residue from said cloth.

2. A filter apparatus as defined in claim 1 in which the channels and tubular members on each filter frame are enclosed by a common cover sheet.

3. A filter apparatus comprising a plurality of filter frames and filter plates assembled in alternate face-to-face relationship providing a horizontally disposed stack, an end plate on each end of said stack, tie rods connecting said end plates, a structure for supporting said stack in an elevated position, a cradle surrounding said stack and mounted for vertical movement on said structure, means for raising and lowering said cradle with respect to said stack, each filter plate comprising a flat annular core providing a central filtrate receiving chamber, a single length of filter cloth in the form of a vertically disposed loop surrounding said core and said chamber, cross members secured to said cradle and to the upper free edges of said cloth, a tension bar disposed in the lower end of said loop, tension springs connected to said bar and said cradle for maintaining said cloth in stretched condition, said core having a passage communicating with said chamber and a conduit connected to said passage for conducting filtrate therefrom and for supplying water or air to said chamber for cleaning said cloth, each filter frame comprising a hoop secured to said supporting structure and having an inwardly opening dovetail groove, a closed generally ringed shaped tubular member of flexible material, a dovetail rib on the periphery of said tubular member, said rib being received in said groove for supporting said tubular member from said hoop, means to supply fluid pressure to said tubular member, an annular sealing rib on one side of said tubular member, said tubular member normally having a flat oval cross sectional shape, whereby upon supplying fluid pressure to said tubular member the cross sectional shape thereof will approach a circle thereby forcing said sealing rib and the opposite side of said tubular member into engagement with the adjacent filter cloth and clamp the same against the cores of adjacent filter plates, the space inwardly of said tubular member serving to receive filter liquid, said sealing rib having a passage for supplying filter liquid to said space.

4. A filter apparatus as defined in claim 3 in which a second annular sealing rib is provided on the opposite side of said tubular member and at least one of said sealing ribs having a passage for supplying filter liquid to said space.

5. A filter apparatus comprising a plurality of filter frames and filter plates assembled in alternate face-to-face relationship providing a horizontally disposed stack, an end plate on each end of said stack, tie rods connecting said end plates, a structure for supporting said stack in an elevated position, a cradle surrounding said stack and mounted for vertical movement on said structure, means for raising and lowering said cradle with respect to said stack, each filter plate comprising a flat annular core providing a central filtrate receiving chamber, a single length of filter cloth in the form of a vertically disposed loop surrounding said core and said chamber, cross members secured to said cradle and to the upper free edges of said cloth, a tension bar disposed in the lower end of said loop, tension springs connected to said bar and said cradle for maintaining said cloth in stretched condition, said core having a passage communicating with said chamber and a conduit connected to said passage for conducting filtrate therefrom and for supplying water or air to said chamber for cleaning said cloth, each filter frame comprising a closed generally ring shaped tubular member of flexible material, spaced lugs on the periphery of said tubular member for securing the same to said supporting structure, means to supply fluid pressure to said tubular member, an annular sealing rib on each side of said tubular member, said tubular member normally having a flat oval cross sectional shape and outwardly projecting cloth scraping knives secured to the lower portion of each frame, the scraping edge of each knife engaging the adjacent filter cloth, whereby upon supplying fluid pressure to said tubular member the cross sectional shape thereof will approach a circle thereby forcing said sealing ribs into engagement with the adjacent filter cloth and clamp the same against the cores of adjacent filter plates, the space inwardly of said tubular member serving to receive liquid, at least one of said sealing ribs having a passage for supplying filter liquid to said space, the liquid in said space being forced through said filtered cloth into said chamber and upon reducing the pressure in said tubular member to restore the flat oval cross-sectional shape and disengage the same from said filter plate, said filter plate is free to move, subsequent downward movement of said filter cloth with respect to said knives serving to scrape accumulated residue from said cloth.

References Cited in the file of this patent

UNITED STATES PATENTS

| 734,898 | Lapp | July 28, 1903 |
| 1,415,859 | Bates | May 16, 1922 |
| 2,849,121 | Burwell | Aug. 26, 1958 |

FOREIGN PATENTS

| 248,132 | Germany | June 18, 1912 |
| 1,149,495 | France | July 15, 1957 |